June 30, 1953

C. H. KLEIN ET AL
PORTABLE HAND TOOL FOR ALTERNATIVE
DIRECT AND STEP-BY-STEP OPERATION 2,643,564

Filed May 28, 1952

Inventors:
Charles H. Klein,
Thomas M. Porter,
by Emery, Booth, Townsend
Miller & Weimer Attys

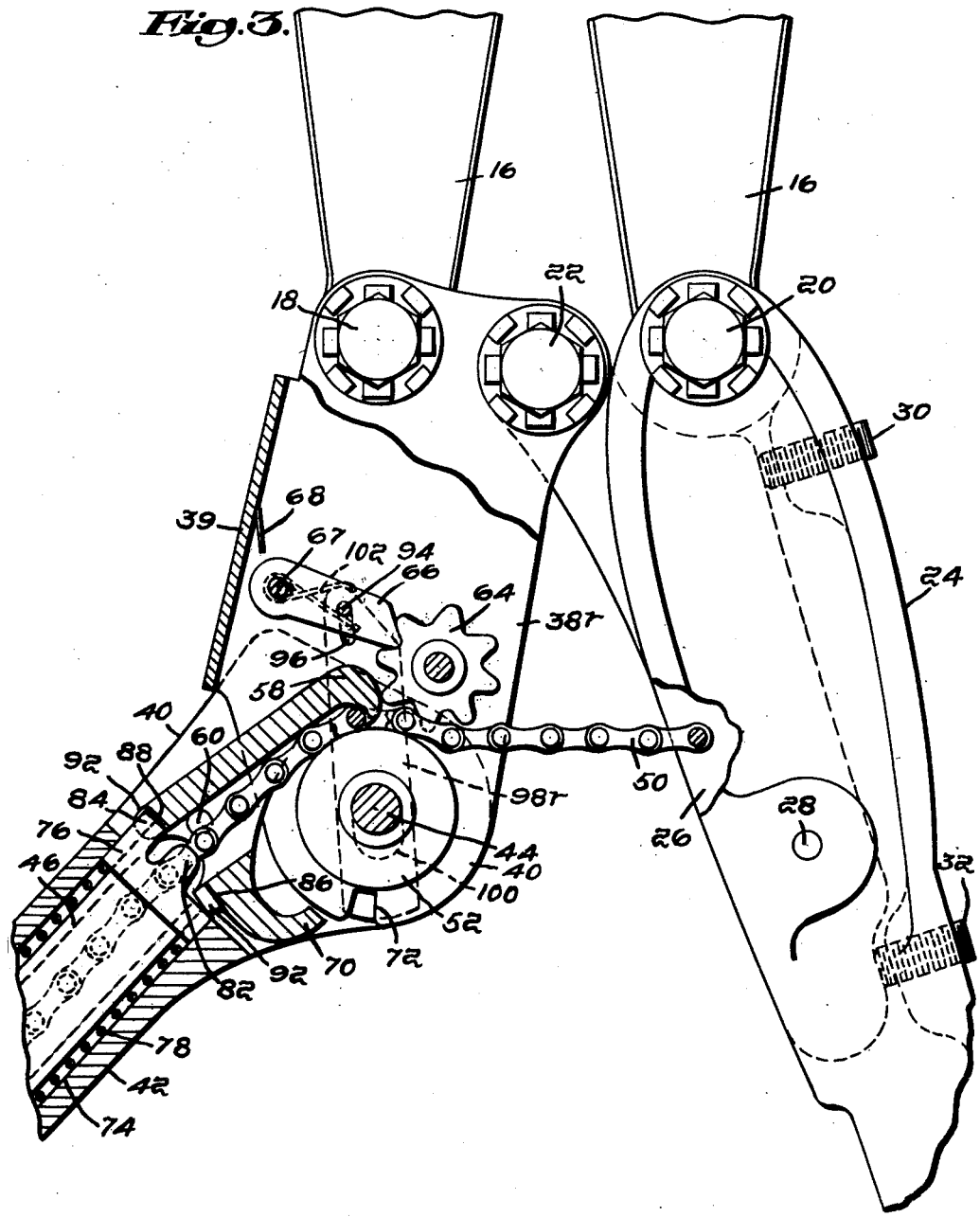

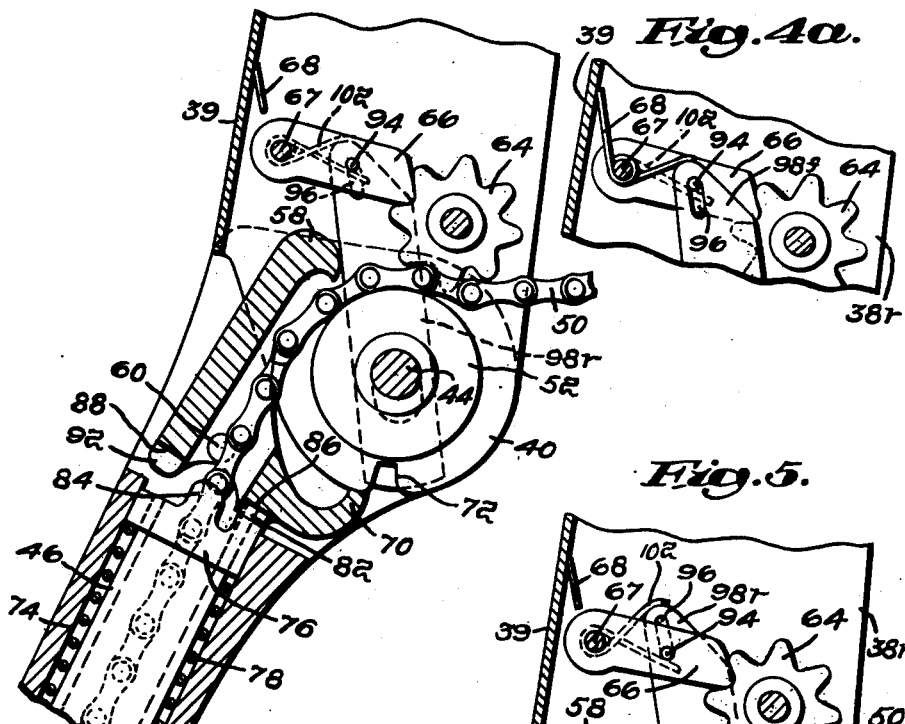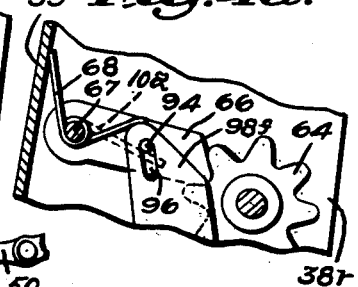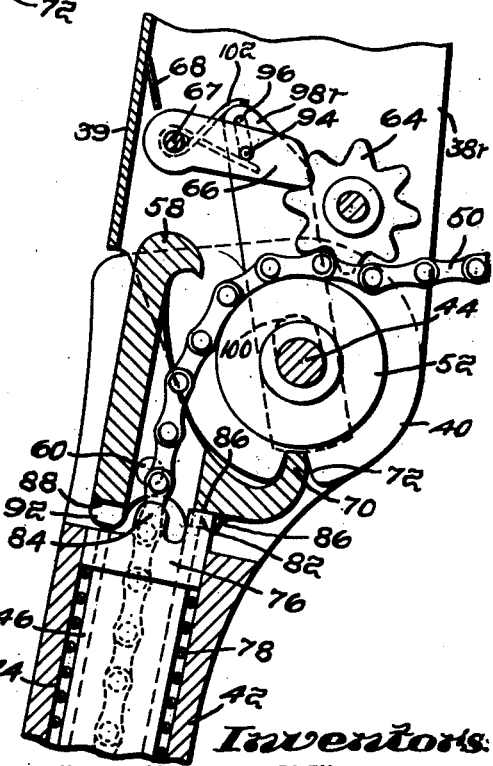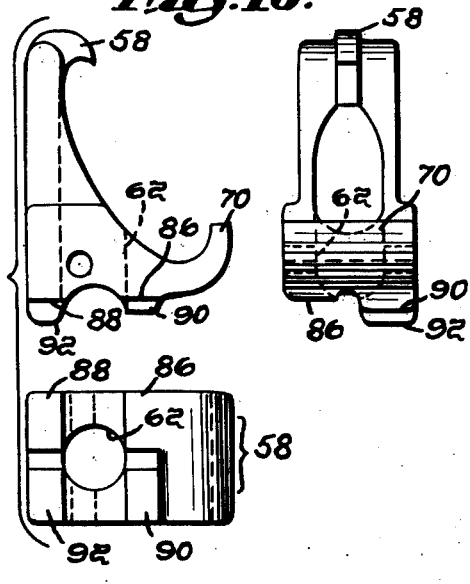

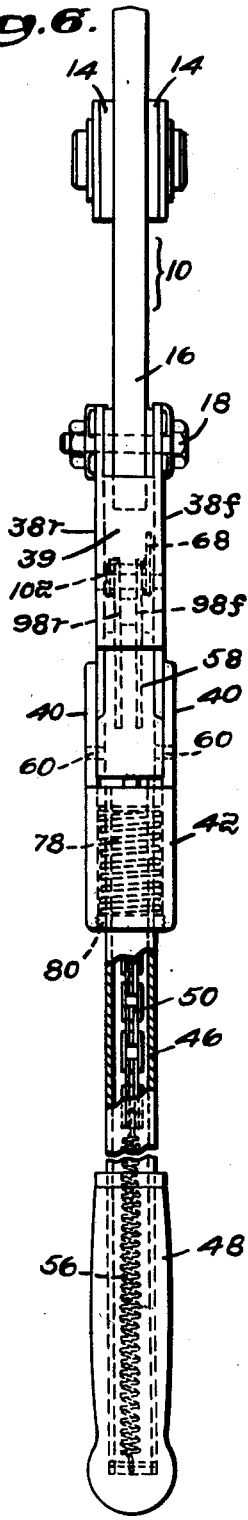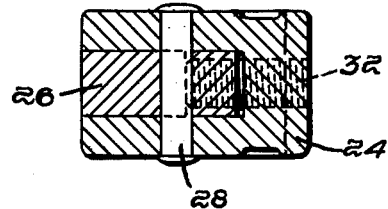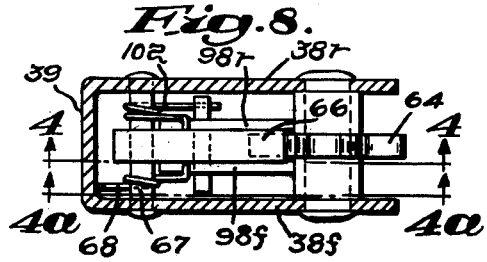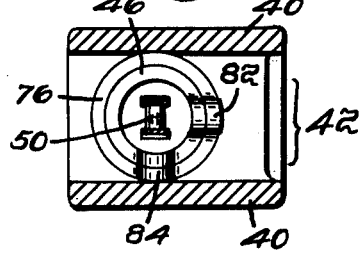

Patented June 30, 1953

2,643,564

UNITED STATES PATENT OFFICE 2,643,564

PORTABLE HAND TOOL FOR ALTERNATIVE DIRECT AND STEP-BY-STEP OPERATION

Charles H. Klein, Cleveland, Ohio, and Thomas M. Porter, Brookline, Mass., assignors to The National Telephone Supply Company, Cleveland, Ohio, a corporation of Ohio Application May 28, 1952, Serial No. 290,492

19 Claims. (Cl. 81—46)

This invention relates to a portable, hand driven, tool of the type having two jaws which are pressed together to operate on a piece of work. The object is to provide a tool which, in view of its capacity, will be relatively small and light and of generally smooth exterior contours, and embodying mechanism for actuating the jaws alternatively operable, by means of a change quickly and easily made while the tool is being held, either to move the jaws together by a single operating stroke or with a step-by-step motion effected by a plurality of such strokes.

Such a tool finds a large field of application in the work of compressing metal sleeves about electric conducting wires and such a tool is herein illustrated and, for convenience in the description, referred to specifically although without limiting intention. In this field a light, small tool is desired which may be carried up a pole by the workman and there operated by the manual power which it is convenient to exert when he is hanging on in such a position. Certain sleeves which are commonly used are compressed at a plurality of points along their length. At their ends great compression is not required and the work is within the range of a relatively short, single stroke tool of the multiple lever type. The tool of the present invention may be so operated. On the other hand between these ends the principal joinings require great force, and here the tool may be operated as a step-by-step or ratcheting tool. When it is a question of compressing an aluminum sleeve on an aluminum wire the work is relatively light and frequently may be effected by a single stroke, but in the case of a steel sleeve of the same size it is relatively heavy and a step-by-step action is necessary or desirable. Also it is desirable to be able to bring the jaws down on the work and perhaps take an initial bite thereon by means of a simple sweep of the hands. Obviously it is desirable to be able to open the jaws in order to present them to the work or to free them therefrom by means of such a rapid single sweep.

The invention will be well understood by reference to the following description taken in connection with the accompaying drawings wherein:

Fig. 3 is a view on an enlarged scale corresponding to a portion of Fig. 2, showing the parts in a position which they occupy in the power phase of a step-by-step movement.

Figure 1:
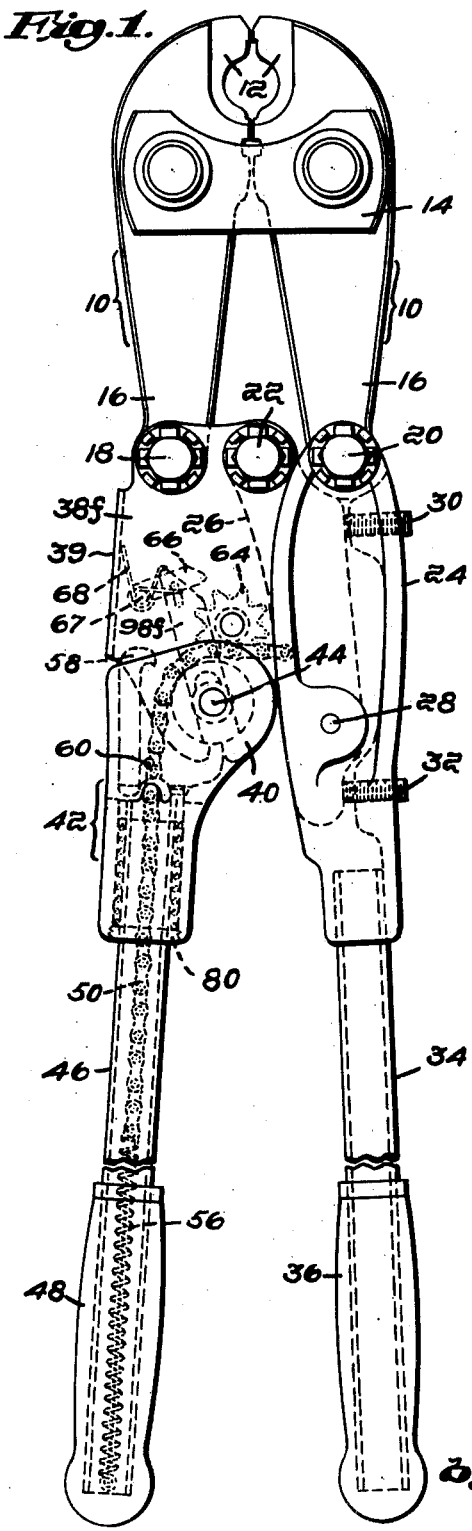
Fig. 1 is a plan view of the tool in closed position, part of the operating arms being broken away to reduce the height of the figure.
Figure 2:
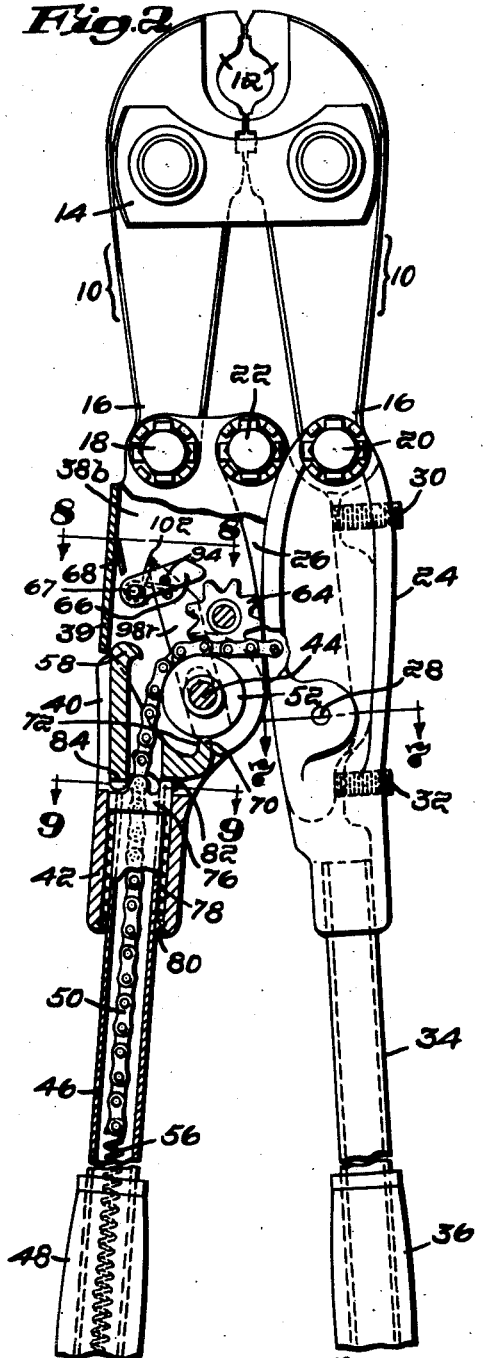
Fig. 2 is a view similar to Fig. 1 with parts broken away to reveal interior mechanism. The parts are in a position which they occupy when the tool is operated as a single stroke tool.

Fig. 4 corresponds to a portion of Fig. 3 and shows the parts in a position which they may occupy in shifting from a position such as Fig. 3 to a locked position as exemplified by Fig. 2 taken on line 4—4 of Fig. 8;

Fig. 4a is similar to a portion of Fig. 4 but is taken on line 4a—4a of Fig. 8;

Fig. 5 is a view similar to Fig. 4 showing a succeeding position of the parts;

Fig. 6 is an edge elevation of the tool as seen from the left of Fig. 1;

Figs. 7, 8 and 9 are enlarged sections on the correspondingly numbered lines of Fig. 2; and Fig. 10 comprises side, end and bottom plan views of a pawl.

In the drawing there is shown a tool embodying a pair of head levers 10 having distal jaw portions 12 suitably formed for the intended work, which levers herein are pivoted together in non-crossing relation on plates 14 and have tail portions 16 which are spread apart to close the jaws. Herein the head levers are moved, when the tool is operated as a single stroke tool, by a lever system of the type disclosed in the patent to Lindsay 146,829, January 27, 1874, the tails of the head levers being pivoted at points 18 and 20 to two bent operating arms which are themselves pivoted together at point 22. The three points form a toggle which is broken when the jaws are opened and straightened to close the same with great force. No reference numerals have been used to designate as such the operating arms just referred to because to do so would merely confuse the necessary detailed description to follow, and they are easily identified by mere inspection.

In the tool shown the right-hand arm, viewing Fig. 1, may be thought of as primarily a means for positioning the tool, or as a base member, and in the use of the tool it functions as a single rigid lever although made up of a number of parts. These herein comprise a channel-shaped "stub" 24 supporting the pivot 20 at its distal end and a link 26 cooperating in the support of the intermediate pivot 22 received between the flanges of the channel and pivoted thereto between its ends at 28. (See Fig. 7.) Screws 30 and 32 extending through the back of the channel prevent the link member 26 from turning on pivot 28, but permit a relative adjustment of pivots 18 and 20. No novelty is claimed for this arrangement, it being essentially like that shown in Fig. 5 of the patent to Porter, 1,146,021, July 13, 1915. The arm is completed by a tubular extension 34 of suitable length terminating in a handgrip 36.

The other operating arm comprises a distal portion having front plates 38f and back plates 38r bridged by a connecting web 39, the plates supporting pivots 18 and 22 in relatively fixed position. The proximal end of this is received between two ears 40 on a "stub" 42, the parts being joined by the pivot 44. These parts may be immobilized at the pivot to move as one by means to be described. A tubular extension 46 with handgrip 48 completes the left-hand side of the tool.

Obviously when the parts 38 and 42 cannot turn relatively about pivot 44 the tool may be operated as a single stroke tool as in the Lindsay patent referred to, and perform any work within the strength of the user.

It is believed that an understanding of the construction illustrated will best be had if there is first described the arrangement whereby, with the parts in the position shown in Fig. 3, the parts 42 and 46 may be swung about pivot 44, as an oscillating lever for drawing together in a step-by-step movement the parts which actuate the head levers. Herein a flexible tension element 50, herein a sprocket chain, of the type known as a roller chain, is anchored to element 26 at the right in Fig. 3 and is trained over a sheave 52 received between plates 38f and 38r turning on pivot 44. The end of the chain is extended into hollow handle 46 out of the way and is connected to a spring 56 which holds that chain taut at all times. Herein for simplicity, instead of making the sheave 52 a sprocket wheel and driving it by a separate ratchet wheel, a pawl 58 of the pull operating type is pivoted on the ends of pins 60 carried by the ears 40 and engages the rollers of the chain, being normally pressed into engagement with the same by a spring, as is usual in ratchet devices. Herein however, the spring arrangement is somewhat unusual and a description thereof may conveniently be postponed to a later paragraph. It may be noted here merely that the spring is designated by numeral 78. The chain 50 as here shown passes to handle extension 46 through a hole 62 in the pawl. The mounting of the pawl on pins 60 instead of a through pivot permits this.

To complete the ratcheting mechanism means is provided to prevent retrograde movement and to "hold on" to the chain as it is hauled in, and herein a sprocket wheel 64 meshes with the chain and is engaged by a detent 66 pivoted at 67 and pressed toward it by a spring 68, Fig. 1, the latter arranged as more fully hereinafter described. The detent clatters over the wheel when the latter turns clockwise when the chain is being hauled on, but falls behind a tooth to prevent counterclockwise movement.

To throw this ratcheting mechanism out of operation and lock the oscillating lever comprising parts 42 and 46 so that it operates as a rigid extension of part 38, a suitable mechanism is provided adapted to be operated by a simple manual movement. In the construction shown the tail of the pawl 58 is provided with a nose portion 70 which, when the pawl is swung counterclockwise to the position shown in Fig. 2, enters notches 72 in sideplates 38f and 38r, as seen in Fig. 2, to lock the parts from pivotal movement. Thus the pawl 58, while a single element, is in function two pawls, a feed pawl for the chain and a detent pawl for the oscillating lever, which two pawls are alternative in use. As will later appear, when the pawl 58 is brought to the position of Fig. 2 the detent 66 is also released and frees sprocket 64. The entire ratcheting mechanism is out and the two operating arms may move as rigid members without impediment therefrom except for the slight tension of spring 56, which keeps the chain 50 taut over sheave 52 and prevents a loop from forming therein which might foul one of the handles or an exterior object.

The tool may be changed over from operation as a simple multiple lever tool to a step-by-step driven tool and back again by simple manual control. Herein this is effected by movement of the hand grasping the left-hand handgrip 48 without release of the latter by the grasping hand. The construction of parts involved will next be described.

The extension 46 which carries the handgrip is mounted for rotation about its axis in a suitable opening 74 in stub 42. The extension has at its distal end an enlarged head 76 forming a rotating bearing for the extension on the walls of the opening. Beneath this head is a compression spring 78 supported by a ring 80 at the proximal end of opening 74 and provided with an additional bearing in which the extension turns.

The distal face of the head 76 (see Figs. 3 and 9) is provided with two camming lobes 82 and 84 ninety degrees apart, the head thus being in form essentially a cylindrical face cam, the cam lobes cooperating respectively with follower surfaces 86 and 88 on the back of pawl 58 at opposite sides of center 60 (see Fig. 10). At the rear of these follower surfaces (viewing Fig. 10) the pawl is provided with stop projections 90 and 92 respectively, which engage respectively lobes 82 and 84, and prevent them from moving past their cooperating surfaces 86 and 88 which lie forwardly of these projections. Thus each lobe moves between a position under a follower surface and an idle position between the same at the front viewings, Figs. 2 and 3.

In Fig. 2 the parts are shown as they would appear after the tool is completely closed with the nose 70 of the pawl engaged in the locking notches 72. The cam lobe 82 underrides surface 86 at the right of pawl center 60 maintaining the pawl nose engaged by the pressure of spring 78 and swinging the left-hand portion of the pawl away from the chain. The tool may be opened and reclosed or partly reclosed without altering the position of the parts. Suppose now, with the tool at least partly open, we wish to shift to ratchet operation. A movement of the hand which holds grip 48 gives it a turn through 90°, counterclockwise from the point of view of one looking distally along the handle axis, viewing Fig. 2. Lobe 82 leaves surface 86 and lobe 84 enters beneath surface 88 as seen in Fig. 3. The spring 78 now supports the pawl in operative relation to the chain and yields to release the chain on the back stroke. The nose 70 is withdrawn from locking notches 72 to permit oscillation of the handle. To restore the parts to the former position the hand grip is rotated back 90°. If the nose 70 of the pawl were directly opposite the notches 72 it would enter them. Generally however it would not be. The nose would then, as seen in Fig. 4, ride on the edges of plates 38f and 38r as the cam lobe 82 entered beneath projection 86, the spring 78 yielding to permit this movement. The extension 46 then may be swung inwardly until the nose reaches the notches and is snapped into them by the expanding spring, as seen in Fig. 5.

The detent 66 in the position of Fig. 3 holds the sprocket wheel 64 against counterclockwise movement, and to completely throw out or disengage the ratcheting mechanism it is moved against the force of spring 68 away from the wheel, as shown in Fig. 1, when the parts of the left-hand arm are locked together to function as a single rigid lever. Herein this freeing of the detent is effected by force applied to the handgrip 48, transmitted through the nose 70 of pawl 58.

Herein the detent has, at a point remote from its pivot 67, a cross pin 94 which enters slots 96 at the upper ends of two links 98f and 98r at either side of the detent. These links are also guided on the pivot pin 44 of the chain sheave 52 by a slot 100 and their lower or proximal ends are presented to the nose 70 of the pawl. The spring 68 (best seen in Figs. 1, 4a and 8) is coiled around the pivot 67 at the nearer side of the detent and has one arm bearing on the top of link 98f and another on web 39. This spring tends to hold the detent in engagement with the sprocket wheel, the pin 94 being in the upper ends of the slots 96. The pin is urged toward that position by another spring 102 coiled around the further end of the pivot 67 and has arms interposed between the top of link 98r and pin 94, the engagement being such that the spring tends to rock the detent counterclockwise relative to the links. When the pawl 58 is moved to the position of Fig. 5 its nose 70 engages the proximal end of links 98 and lifts them. If the links were connected directly to the detent 66 and the latter were under considerable end pressure from sprocket wheel 64 because of a heavy load of the work on the jaws, free movement of the pawl 58 to the position of Fig. 5 under the action of spring 76 and the entry of nose portion 70 into the locking notches 72 would be resisted. In the case of a sleeve-compressing tool designed so that the toggle reaches dead center when the desired ultimate compression is obtained the load would be on the column thus provided and tension on the chain would be relieved. Also, if desired, the parts may be so designed that in this position the detent rests on top of a tooth. In the case of a cutting tool if the work were severed there would be no load. However, it is sometimes desired to shift the pawl at an earlier stage to permit the tool to be opened and removed. Therefore in the construction shown the links are given a lost motion relative to the detent, so that this movement is not resisted by the end pressure on the detent, but the movement stores up energy in spring 102 which thereafter is released to free the detent when the end pressure thereon is released, the entire action occurring as the result of a substantially single control movement of the grasping hand at handgrip 48.

When the parts move from the position of Fig. 4 to the position of Fig. 5, the links 98 move up against the spring 68, but, if the detent 66 remains stationary, this occurs with lost motion relative to the detent, the pin 94 of which will then be in the lower portions of the slots 96 as seen in Fig. 5, spring 102 being compressed. The nose 70 of the pawl 58 freely enters locking notches 72 and the left-hand arm of the tool is made rigid. A very slight inward movement of this arm, corresponding to a substantially imperceptible travel of the jaws, relieves the end pressure on the detent. This releases spring 102 which expands to throw the detent out of engagement with the sprocket wheel, pin 94 then returning to the distal ends of the slots 96.

In the normal operation of the tool it is held by the hands with the wrists straight and the forearms extending outwardly from the operating parts of the tool. Thus as the grasping hand rotates handgrip 48 it is natural for it to exert an inward pressure on the same. Moreover, as only by chance would the tail 70 be opposite notches 72, normally the grip would be swung outward before turning and then moved in to permit the tail to find its way into them as previously described. As it does so and the lever is locked, the resistance is felt and an increase of pressure in the same direction of movement provides for relieving the end pressure on the detent, which snaps out automatically, the action being essentially a single one and not involving on the part of the operator separate and independent manipulations. While not literally simultaneous, in practical effect the throwing out of feed pawl 58 to inoperative position, the transformation of the operating arm into a single rigid unit, and the release of the detent occur together as the result of an essentially single manual control movement.

For convenience herein and particularly in the claims, to avoid such locutions as "one and the other" or "first and second" which are not always easy to follow, certain parts have been referred to as "distal" and "proximal" having reference to a tool as illustrated from the point of view of a user grasping the handgrips 36 and 48. These words provide for indentification of and discrimination between the elements of the illustrative embodiment of the invention shown, but are not otherwise significant. Similarly the words "right" and "left," "front" and "rear" are from the point of view of a reader viewing Figs. 1, 2, 3, 4 and 5.

We are aware that the invention may be embodied in other specific forms without departing from the spirit or essential attributes thereof, and we therefore desire the present embodiment to be considered in all respects as illustrative and not restrictive, as is in fact clear in several matters from the description itself. Reference is to be had to the appended claims to indicate those principles of the invention exemplified by the particular embodiment described and which we desire to secure by Letters Patent.

We claim:

1. A portable tool comprising work-engaging jaws and first and second relatively swinging arms connected thereto to approximate and separate the jaws on in and out movements of the arms, the second of the arms comprising a distal part which is connected to one of the jaws and a proximal part pivotally connected to the distal part to provide for oscillation of the former relative to the latter, a releasable locking device for securing together the proximal and distal parts against relative pivotal movement, a pulling member connected to the first arm, a ratcheting mechanism carried by the second arm and driven by oscillation of the proximal part for hauling on said member, a single control device accessible to a hand grasping the proximal end of said oscillating proximal part, and motion transmitting means driven thereby effective to disconnect and connect said ratcheting mechanism, and in correlation to engage and disengage the locking device.

2. A tool as defined in claim 1, wherein said control device includes the portion of the proximal part which is normally grasped by the hand and is arranged for turning by the hand about an axis extending lengthwise of said part for effecting the control actions defined.

3. A portable tool comprising work-engaging jaws and first and second relatively swinging arms connected thereto to approximate and separate the jaws on in and out movements of the arms, the second of the arms comprising a distal part which is connected to one of the jaws and a proximal part pivotally connected to the distal part to provide for oscillation of the former relative to the latter, a pulling member connected to the first arm, a ratcheting mechanism carried by the second arm for hauling on said member and comprising a pawl on the proximal part, a locking device for securing together the proximal and distal parts against relative pivotal movement and means for throwing in and out said pawl and in correlation engaging and disengaging the locking device comprising a single control device including the portion of the proximal part which is normally grasped by the hand, which part is arranged for turning by the hand about an axis extending lengthwise of the part and a spring-supported, distally pressed face cam turned therewith having lobes which operate the pawl and locking device respectively.

4. A tool as defined in claim 3, wherein a detent is provided to prevent retrograde movement of the ratcheting mechanism and the means which engages the locking mechanism transmits lifting movement to the detent through a compressible spring providing for storing energy in the spring if the detent is restrained by end pressure thereon and for lifting of the detent by release of such energy when the end pressure is relieved.

5. A portable tool comprising work-engaging jaws and first and second relatively swinging arms connected thereto to approximate and separate the jaws on in and out movements of the arms, the second of the arms comprising a distal part which is connected to one of the jaws and a proximal part pivotally connected to the distal part to provide for oscillation of the former relative to the latter, a pulling member connected to the first arm, a ratcheting mechanism carried by the second arm for hauling on said member and comprising a driving pawl on the proximal part, a locking device for securing together the proximal and distal parts against relative pivotal movement, and a member responsive to a single movement of the hand providing for alternatively throwing out and in said pawl and in correlation engaging and disengaging the locking device.

6. A portable tool comprising work-engaging jaws and first and second relatively swinging arms connected thereto to approximate and separate the jaws on in and out movements of the arms, the second of the arms comprising a distal part which is connected to one of the jaws and a proximal part pivotally connected to the distal part to provide for oscillation of the former relative to the latter, a pulling member connected to the first arm, a ratcheting mechanism carried by the second arm and driven by oscillation of the proximal part for hauling on said member, a locking device for securing together the proximal and distal parts against relative pivotal movement and a manually controlled positioning means responsive to a single movement of the hand for alternatively rendering said ratcheting mechanism effective and ineffective and in correlation therewith disengaging and engaging the locking device.

7. A portable tool comprising work-engaging jaws and first and second relatively swinging arms connected thereto to approximate and separate the jaws on in and out movements of the arms, the second of the arms comprising a distal part which is connected to one of the jaws and a proximal part pivotally connected to the distal part to provide for oscillation of the former relative to the latter, a flexible pulling member connected to the first arm, a bearing on the distal part of the second arm about which said member passes, the member being terminally connected to a take-up spring, a ratcheting device for hauling on the flexible pulling member at a point between its ends, and means under manual control for disconnecting the ratcheting device.

8. A tool as definde in claim 7 wherein said oscillating proximal part is hollow and the end portion of the pulling member and the spring are housed therein.

9. A tool as defined in claim 7 wherein manually controlled means are provided for locking the oscillating proximal part against movement about its pivot when the ratcheting device is disconnected.

10. A portable tool comprising work-engaging jaws and first and second relatively swinging arms connected thereto to approximate and separate the jaws on in and out movements of the arms, the second of the arms comprising a distal part which is connected to one of the jaws and a proximal part pivotally connected to the distal part to provide for oscillation of the former relative to the latter, a sprocket chain anchored to the first arm, and a sheave on the distal part of the second arm over which the chain passes, and a ratcheting device driven by the oscillation of the proximal part including a pawl for engaging the pins of the chain in the portion thereof supported by the sheave.

11. A portable tool comprising work-engaging jaws and first and second relatively swinging arms connected thereto to approximate and separate the jaws on in and out movements of the arms, the second of the arms comprising a distal part which is connected to one of the jaws and a proximal part pivotally connected to the distal part to provide for oscillation of the former relative to the latter, a sprocket chain anchored to the first arm, a sheave on the distal part of the second arm over which the chain passes, a sprocket wheel engaging the chain, a detent for the wheel, a drive pawl on the proximal part for engaging the chain, a lock for securing together proximal and distal parts against relative pivotal movement, the proximal part including a rotatably mounted portion which is gripped by the hand when the latter is positioned for swinging the second arm and which on rotation on the one hand releases the detent, throws out the pawl and engages the lock, and on the other throws in the detent and the pawl and disengages the lock.

12. A tool as defined in claim 11 wherein the chain is anchored at one end and a spring draws on the other end of the chain.

13. A tool as defined in claim 12 wherein the proximal part is hollow and receives the other end of the chain and the spring.

14. A portable tool comprising work-engaging jaws and first and second relatively swinging arms connected thereto to approximate and separate the jaws on in and out movements of the arms, the second of the arms comprising a distal part which is connected to one of the jaws and a proximal part pivotally connected to the distal part to provide for oscillation of the former relative to the latter, a pulling member on the first arm, a ratcheting mechanism on the second for hauling on the member arm comprising a driving pawl on the proximal part, an arcuate member on the distal part concentric with the pivotal axis of the proximal part and having a notch, a locking pawl on the proximal part adapted to be pressed toward said arcuate part to ride thereon and to move into said notch when opposite the same, and manually controlled means for alternatively yieldingly pressing said feed pawl to operating position and said locking pawl toward said arcuate surface.

15. A tool as defined in claim 14 wherein the ratcheting mechanism includes a spring-pressed detent and the locking pawl is connected thereto to lift it against its spring when the pawl enters the notch.

16. A tool as defined in claim 14 wherein the connection to the detent is through a spring to be compressed on entry of the locking pawl thereafter to lift the detent when end pressure thereon is relieved.

17. A tool as defined in claim 14 wherein the feed pawl and the locking pawl are a single member pivoted between its ends and the pressure is applied thereto at opposite sides of the pivot respectively to throw in one pawl and retract the other.

18. A portable tool comprising work-engaging jaws and first and second relatively swinging arms connected thereto to approximate and separate the jaws on in and out movements of the arms, the second of the arms comprising a distal part which is connected to one of the jaws and a proximal part pivotally connected to the distal part to provide for oscillation of the former relative to the latter, a force-transmitting member connected to the first arm and extending to said distal part, connecting means for connecting the proximal part to said force-transmitting member to operate the same with mechanical advantage from the proximal part on oscillation of the latter, a locking device for securing together the proximal and distal parts against relative oscillating movement, and control means operable by a single movement of the hand between first and second control positions providing respectively, first, for release of said locking means and the rendering operative of said connecting means and, second, for engagement of said locking means and the rendering inoperative of said connecting means.

19. A tool as defined in claim 18, wherein said control means is associated with the proximal part and is operated by movement to different rotative positions about the axis of said part.

CHARLES H. KLEIN.
THOMAS M. PORTER.

References Cited in the file of this patent

UNITED STATES PATENTS

| Number | Name | Date |
|---|---|---|
| 146,829 | Lindsay | Jan. 27, 1874 |
| 1,146,021 | Porter | July 13, 1915 |
| 2,017,039 | Carlson | Oct. 15, 1935 |
| 2,254,416 | Burns | Sept. 2, 1941 |
| 2,290,197 | Merriman et al. | July 21, 1942 |
| 2,292,391 | Merriman et al. | Aug. 11, 1942 |